(12) United States Patent
Stenger et al.

(10) Patent No.: US 12,260,444 B2
(45) Date of Patent: Mar. 25, 2025

(54) INFORMATION PROCESSING APPARATUS, INFORMATION PROCESSING METHOD, AND NON-TRANSITORY COMPUTER READABLE MEDIUM

(71) Applicant: Rakuten Group, Inc., Tokyo (JP)

(72) Inventors: Bjorn Stenger, Tokyo (JP); Mitsuru Nakazawa, Tokyo (JP)

(73) Assignee: Rakuten Group, Inc., Tokyo (JP)

( * ) Notice: Subject to any disclaimer, the term of this patent is extended or adjusted under 35 U.S.C. 154(b) by 0 days.

(21) Appl. No.: 17/926,378

(22) PCT Filed: Dec. 21, 2021

(86) PCT No.: PCT/JP2021/047196
§ 371 (c)(1),
(2) Date: Nov. 18, 2022

(87) PCT Pub. No.: WO2023/119394
PCT Pub. Date: Jun. 29, 2023

(65) Prior Publication Data
US 2024/0221050 A1    Jul. 4, 2024

(51) Int. Cl.
*G06Q 30/00*  (2023.01)
*G06Q 30/0242*  (2023.01)
*G06Q 30/0601*  (2023.01)
*G06V 10/44*  (2022.01)

(52) U.S. Cl.
CPC ..... *G06Q 30/0631* (2013.01); *G06Q 30/0242* (2013.01); *G06V 10/44* (2022.01)

(58) Field of Classification Search
None
See application file for complete search history.

(56) References Cited

U.S. PATENT DOCUMENTS

| | | | |
|---|---|---|---|
| 2018/0033045 A1* | 2/2018 | Flynn | G06Q 30/0269 |
| 2018/0315098 A1* | 11/2018 | Wang | G06Q 30/0276 |
| 2019/0205929 A1* | 7/2019 | Snibbe | G06Q 30/0251 |
| 2021/0272155 A1* | 9/2021 | Izrailev | G06Q 30/0261 |
| 2023/0020218 A1* | 1/2023 | Berger | G06V 40/161 |

FOREIGN PATENT DOCUMENTS

| | | |
|---|---|---|
| JP | 2007-201741 A | 8/2007 |
| JP | 2017-21594 A | 1/2017 |
| JP | 2020-42317 A | 3/2020 |

* cited by examiner

*Primary Examiner* — Mila Airapetian
(74) *Attorney, Agent, or Firm* — Sughrue Mion, PLLC

(57) ABSTRACT

An information processing apparatus (10): sets a plurality of styles that each indicate a moving-image composition of a moving image which relates to a predetermined item and in which a plurality of pieces of image content corresponding to the predetermined item are used; acquires an attribute of a target user; estimates the most-suitable style for the target user among the plurality of styles based on the plurality of pieces of image content and the attribute of the target user; and provides a moving image that is in accordance with the estimated style to the user.

15 Claims, 11 Drawing Sheets

FIG.3C

|  | FIRST STYLE | SECOND STYLE |
|---|---|---|
| (1) IMAGE SELECTION | img#1, img#3, img#4 | img#2, img#5 |
| (2) IMAGE ORDER | img#1→img#4→img#3 | img#5→img#2 |
| (3) TARGET MOVING-IMAGE LENGTH | 30 sec | 15 sec |
| (4) TIME PER CONTENT | 10 sec | 7.5 sec |
| (5) TRANSITION EFFECT | BLEND MODE | WIPE MODE |
| (6) DISPLAY OF RELATED TEXT AND/OR GRAPHICS | NO | YES (img#6) |
| (7) SELECTION OF INITIAL IMAGE AND/OR FINAL IMAGE | NO | YES (img#7, img#8) |
| (8) MUSIC SELECTION | msc#1 | msc#3 |
| (9) INCLUSION/NON-INCLUSION OF ACTIVE LINK | INCLUDED (http://aaa.aaa),img#3 | NOT INCLUDED |

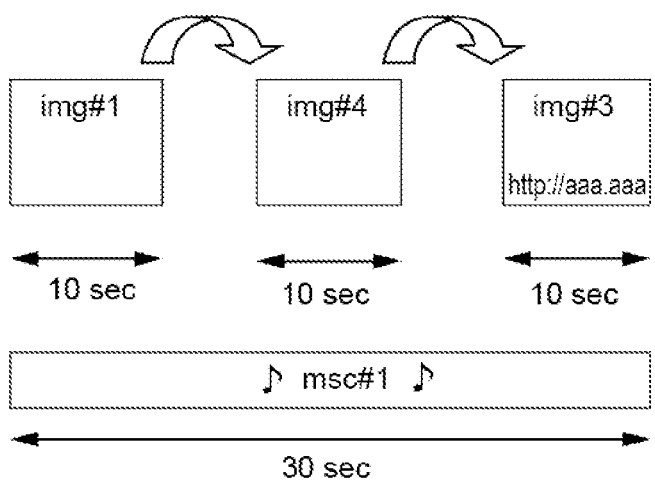

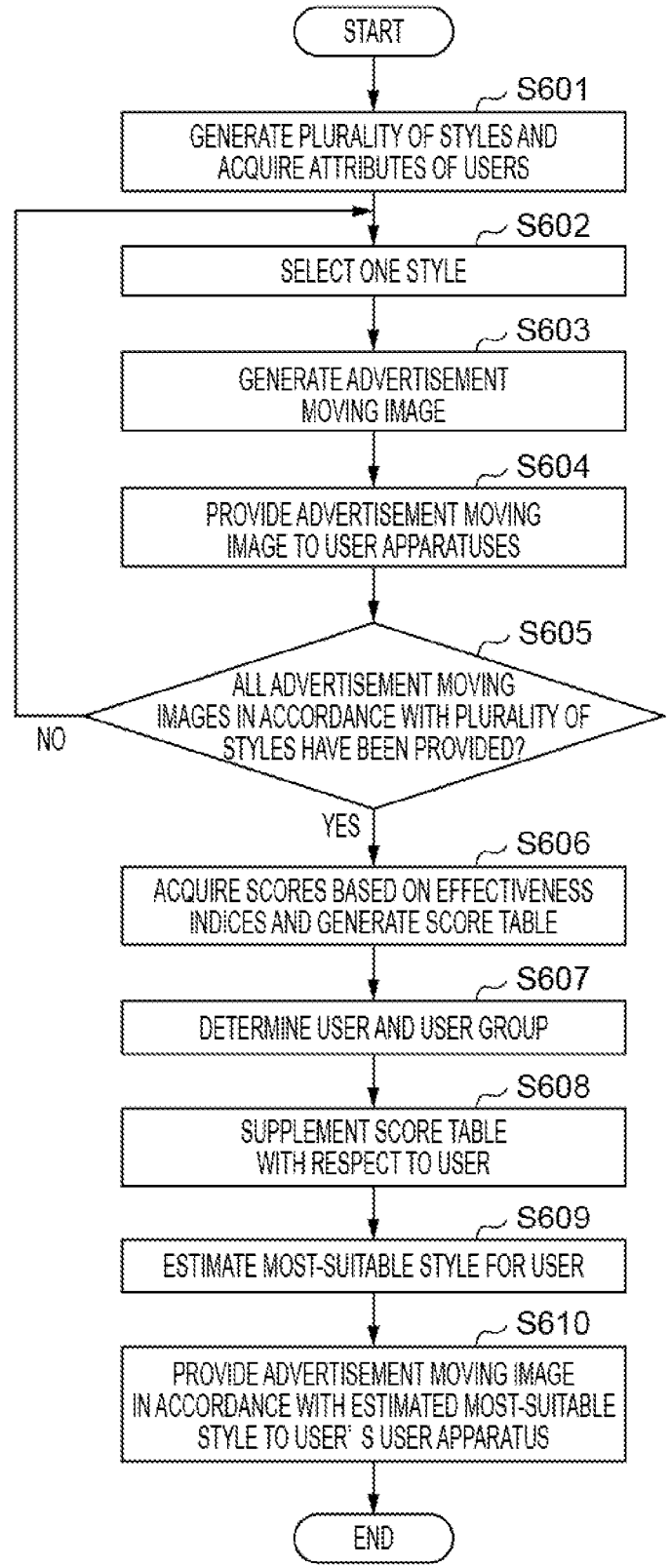

FIG.7A

|  | FIRST STYLE 71-1 | SECOND STYLE 71-2 | THIRD STYLE 71-3 | . . . | STH STYLE 71-S |
|---|---|---|---|---|---|
| 1 USER | 0.67 |  | 0.3 |  |  |
| 2 USER |  | 0.61 |  | 0.1 | 0.53 |
| 3 USER | 0.73 |  | 0.4 | 0.2 |  |
|  |  |  |  |  |  |
| C USER | 0.70 |  |  |  |  |

FIG.7B

|  | FIRST STYLE 71-1 | SECOND STYLE 71-2 | THIRD STYLE 71-3 | . . . | STH STYLE 71-S |
|---|---|---|---|---|---|
| 1 USER | 0.67 |  | 0.3 |  |  |
| 2 USER |  | 0.61 |  | 0.1 | 0.53 |
| 3 USER | 0.73 |  | 0.4 | 0.2 |  |
|  |  |  |  |  |  |
| C USER | 0.70 |  | 0.35 |  |  |

INFORMATION PROCESSING APPARATUS, INFORMATION PROCESSING METHOD, AND NON-TRANSITORY COMPUTER READABLE MEDIUM

CROSS REFERENCE TO RELATED APPLICATIONS

This application is a National Stage of International Application No. PCT/JP2021/047196 filed Dec. 21, 2021.

TECHNICAL FIELD

The present invention relates to an information processing apparatus, an information processing method, and a program, and particularly relates to a technique for providing moving images for advertisement.

BACKGROUND ART

In recent years, items such as products and services are being widely promoted and advertised on webpages. Such promotion and advertisements are constituted from images including text, slide-show moving images of such images, etc., with efforts being made to attract user attention.

Patent Literature Document 1 discloses a method in which, based on a plurality of images selected in accordance with a predetermined rule and creation instruction information created in accordance with the rule, a slide show in which the plurality of images are used is created.

LISTING OF REFERENCES

Patent Literature Documents

Patent Literature Document 1: JP 2017-021594A

SUMMARY OF THE INVENTION

Problems to be Solved by the Invention

However, while a slide show can be created based on a predetermined rule according to the method disclosed in Patent Literature Document 1, the rule is preset. Accordingly, if an advertisement moving image is created using the method according to Patent Literature Document 1, advertisement content optimized for a user is not created, and the advertising effect cannot be enhanced.

The present invention has been made in view of the above-described problem, and an object thereof is to provide a technique for providing a moving image having a high advertising effect with respect to a user.

Solution to the Problems

In order to solve the above-described problem, one aspect according to the present invention is an information processing apparatus including: a setting unit configured to set a plurality of styles that each indicate a moving-image composition of a moving image which relates to a predetermined item and in which a plurality of pieces of image content for the predetermined item are used; an acquiring unit configured to acquire an attribute of a target user; an estimating unit configured to estimate the most-suitable style for the target user among the plurality of styles based on the plurality of pieces of image content and the attribute of the target user; and a providing unit configured to provide a moving image that is in accordance with the estimated style to the user.

In the information processing apparatus, the providing unit may provide each one of moving images that are in accordance with the respective ones of the plurality of styles to one or more users selected from a plurality of users including the target user, and the estimating unit may acquire scores indicating an advertising effect from the one or more users for each of the plurality of styles, and may estimate the most-suitable style for the target user based on the scores.

In the information processing apparatus, the estimating unit may estimate, as the most-suitable style, one of the plurality of styles that has the highest score for the target user.

In the information processing apparatus, the acquiring unit may acquire attributes of the plurality of users, and the estimating unit may derive the scores for one or more of the plurality of styles for which the scores have not been acquired from the target user using the scores acquired from a plurality of users belonging to a group of users having attributes similar to the attribute of the target user.

In the information processing apparatus, the estimating unit may change the size of the group of users in accordance with the attribute of the target user.

The information processing apparatus may further include a selecting unit configured to select one of the plurality of styles, and the estimating unit may estimate the most-suitable style for the target user by further using the selected style as a basis.

In the information processing apparatus, the estimating unit may extract feature vectors of the plurality of pieces of image content, and output the score for the selected style by inputting, to a machine learning model, the feature vectors of the plurality of pieces of image content, the selected style, and the attribute of the target user.

In the information processing apparatus, the setting unit may update the plurality of styles in accordance with the scores.

Each of the plurality of pieces of image content may be constituted from a still image or a moving image.

Each of the plurality of pieces of image content may include text information regarding the predetermined item.

Each of the plurality of pieces of image content may be image content constituting webpages corresponding to the predetermined item.

The plurality of styles may each be individually formed by combining a plurality of settings.

The plurality of settings may at least include a setting regarding a selection of two or more pieces of image content from the plurality of pieces of image content.

The plurality of settings may include at least one of: a setting regarding a playback order in a moving image constituted from the two or more pieces of image content; a setting regarding a playback duration of the entire moving image constituted from the two or more pieces of image content; a setting regarding a playback time per each of the two or more pieces of image content; a setting regarding a mode of transition between the two or more pieces of image content; a setting regarding display of text information and graphics; a setting regarding the initial image and/or the final image of the moving image constituted from the two or more pieces of image content; a setting regarding music; a setting regarding whether or not an active link is included; and an image aspect ratio to be applied when the moving image constituted from the two or more pieces of image content is displayed.

The predetermined item may be a tangible or intangible product, or a service.

In order to solve the above-described problem, one aspect according to the present invention is an information processing method including: setting a plurality of styles that each indicate a moving-image composition of a moving image which relates to a predetermined item and in which a plurality of pieces of image content for the predetermined item are used; acquiring an attribute of a target user; estimating the most-suitable style for the target user among the plurality of styles based on the plurality of pieces of image content and the attribute of the target user; and providing a moving image that is in accordance with the estimated style to the user.

In order to solve the above-described problem, one aspect according to the present invention is an information processing program for causing a computer to execute information processing, wherein the program is for causing the computer to execute processing including: setting processing for setting a plurality of styles that each indicate a moving-image composition of a moving image which relates to a predetermined item and in which a plurality of pieces of image content for the predetermined item are used; acquiring processing for acquiring an attribute of a target user; estimating processing for estimating the most-suitable style for the target user among the plurality of styles based on the plurality of pieces of image content and the attribute of the target user; and providing processing for providing a moving image that is in accordance with the estimated style to the user.

Advantageous Effects of the Invention

According to the present invention, a moving image having a high advertising effect with respect to a user can be generated.

BRIEF DESCRIPTION OF THE DRAWINGS

FIG. 3C illustrates an example of data stored in a moving image information storing unit 110.

FIG. 4 is a diagram schematically illustrating playback of an advertisement moving image.

FIG. 6 illustrates a flowchart of processing executed by the information processing apparatus 10.

FIG. 7A illustrates an example of a score table.

FIG. 7B illustrates an example of a score table.

DESCRIPTION OF EMBODIMENTS

Embodiments for implementing the present invention will be described in detail below with reference to the attached drawings. Among the constituent elements disclosed below, constituent elements having the same function are provided with the same reference symbols and description thereof will be omitted. Note that the embodiments disclosed below are examples of means for realizing the present invention and shall be modified or altered, as appropriate, depending on the configuration of the apparatus to which the present invention is applied and various conditions; that is, the present invention is not limited to the embodiments below. Furthermore, it is not necessarily the case that all combinations of features described in the present embodiments are necessary as means for solution according to the present invention.

First Embodiment

[Configuration of Information Processing System]

Figure 1:
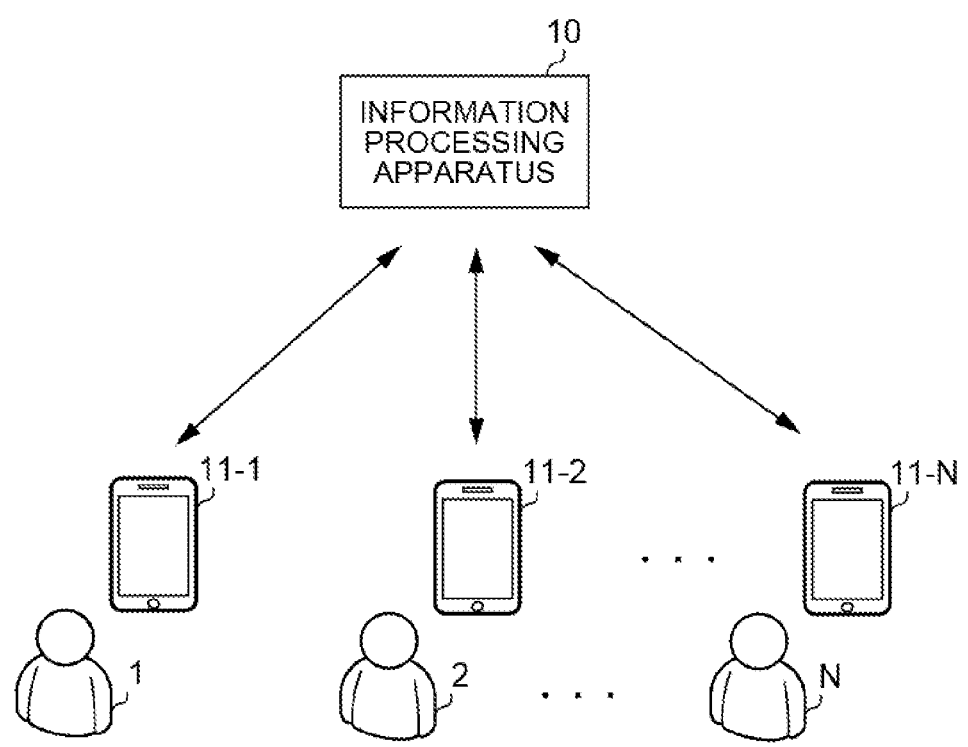
FIG. 1 illustrates an example of a configuration of an information processing system.

FIG. 1 illustrates an example of a configuration of an information processing system according to the present embodiment. As one example thereof is illustrated in FIG. 1, the present information processing system is configured to include an information processing apparatus 10, and a plurality of user apparatuses 11-1 to 11-N (where N>1) used by a plurality of users 1 to N. Note that, unless particularly indicated otherwise, the user apparatuses 11-1 to 11-N may be collectively referred to as a user apparatus 11 or user apparatuses 11 in the description below. Furthermore, the terms "user apparatus" and "user" may be used in the same meaning in the description below.

For example, the user apparatus 11 is a device such as a smartphone or a tablet, and is configured to be capable of communicating with the information processing apparatus 10 via a public network such as Long-Term Evolution (LTE) or a wireless communication network such as a wireless local area network (LAN). The user apparatus 11 includes a display unit (display surface) such as a liquid-crystal display, and the users 1 to N can perform various types of operations via a graphical user interface (GUI) that the liquid-crystal display is equipped with. The operations include various types of operations performed on content such as images displayed on a screen, such as tap, slide, and scroll operations performed using a finger, a stylus, or the like.

Note that the user apparatus 11 is not limited to a device of a form as illustrated in FIG. 1, and may be a device such as a desktop personal computer (PC) or a laptop PC. In such a case, the operations by the users 1 to N may be performed using input devices such as a mouse and a keyboard. Furthermore, the user apparatus 11 may include the display surface as a separate component.

The information processing apparatus 10 provides (distributes) advertisement moving images relating to items such as tangible or intangible products and services (such as travel products) to the user apparatuses 11-1 to 11-N, and the user apparatuses 11-1 to 11-N display the received advertisement moving images on the display units (corresponding to the display unit 56 in FIG. 5) of the user apparatuses 11-1 to 11-N. Here, intangible products include digital content, for example. The information processing apparatus 10 receives indices (hereinafter "effectiveness indices") indicating the advertising effect of the advertisement moving images provided to the user apparatuses 11-1 to 11-N, and acquires scores (values indicating the advertising effect of the advertisement moving images) based on the effectiveness indices. Furthermore, based on the acquired scores, the information processing apparatus 10 generates an advertisement moving image that is suitable for a user among the users 1 to N, and provides the advertisement moving image to the user's user apparatus. Examples of the effectiveness indices and the scores will be described later.

[Functional Configuration of Information Processing Apparatus 10]

The information processing apparatus 10 according to the present embodiment sets a plurality of moving-image composition styles (hereinafter also referred to as "composition styles" or "styles"), generates an advertisement moving image in accordance with a style selected from the plurality of styles, and provides (distributes) the advertisement moving image to one or more of the user apparatuses 11-1 to 11-N. Specifically, the information processing apparatus 10 generates a plurality of advertisement moving images in accordance with a plurality of different styles, and provides each of the plurality of advertisement moving images to at least some of the user apparatuses 11-1 to 11-N, rather than to all of the user apparatuses. After providing the advertisement moving images, the information processing apparatus 10 acquires scores relating to the moving images from effectiveness indices (indices for measuring advertising effect) received from the user apparatuses 11-1 to 11-N. Based on the scores and attributes of the users, the information processing apparatus 10 generates an advertisement moving image that is most suitable for a user, and provides the advertisement moving image to the user's user apparatus.

Figure 2:
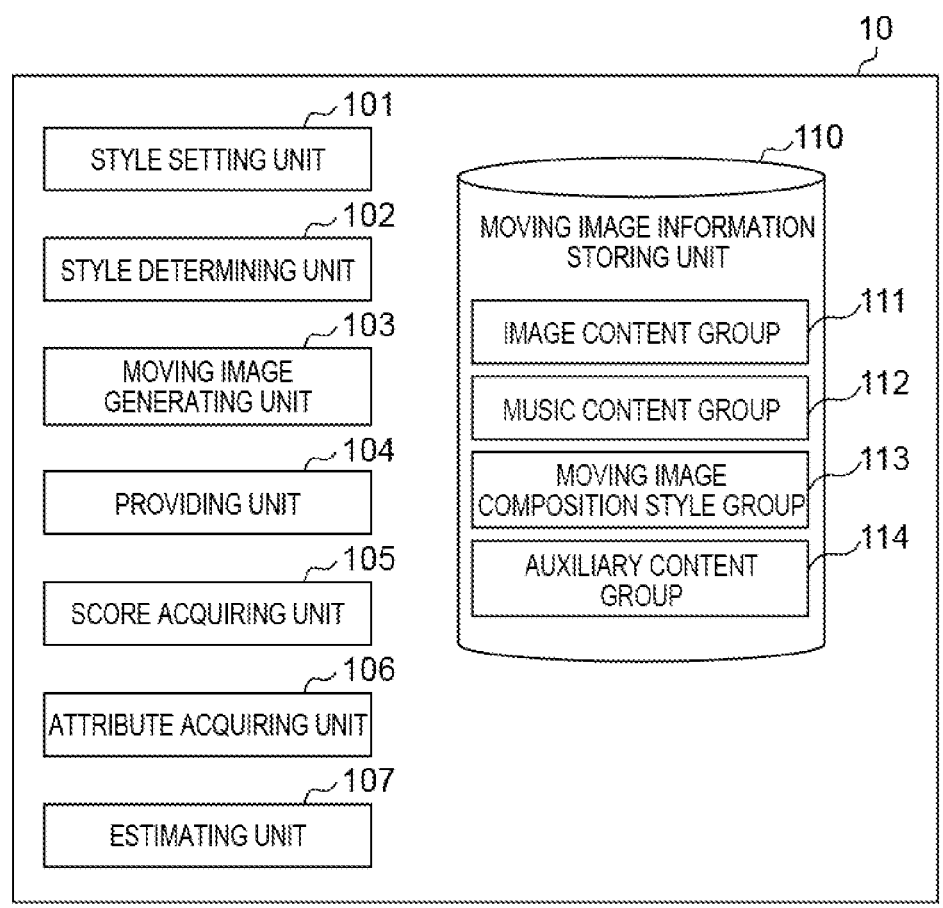
FIG. 2 illustrates an example of a functional configuration of an information processing apparatus 10 according to a first embodiment.

FIG. 2 illustrates one example of a functional configuration of the information processing apparatus 10 according to the present embodiment. As one example of the functional configuration thereof, the information processing apparatus 10 according to the present embodiment includes a style setting unit 101, a style determining unit 102, a moving image generating unit 103, a providing unit 104, a score acquiring unit 105, an attribute acquiring unit 106, an estimating unit 107, and a moving image information storing unit 110. An image content group 111, a music content group 112, a moving image composition style group 113, and an auxiliary content group 114 are stored in the moving image information storing unit 110.

The image content group 111 includes a plurality of pieces of image content that can be used in advertisement moving images. Note that, in the present specification, it is to be construed that the term "image (image content)" includes a still image and/or a moving image.

The music content group 112 includes a plurality of pieces of music content that can be played back along with playing back of generated advertisement moving images. For example, the pieces of music content may be stored in the music content group 112 in the form of music files such as MP3 or AAC music files.

The moving image composition style group 113 includes a plurality of styles for generating advertisement moving images. In the present embodiment, the moving image composition style group 113 at least includes a plurality of styles for generating advertisement moving images relating to one predetermined item (tangible or intangible product or service). The styles are individually formed by combining a plurality of settings. Examples of the styles will be described later. In the present embodiment, each advertisement moving image is generated in accordance with one style determined (selected) from the plurality of styles included in the moving image composition style group 113.

The auxiliary content group 114 includes, as pieces of auxiliary content, a plurality of pieces of text information and graphics, symbols, etc., that can be displayed along with playing back of generated advertisement moving images.

The style setting unit 101 sets (generates) a plurality of styles using at least one of the plurality of pieces of image content included in the image content group 111, the plurality of pieces of music content included in the music content group 112, and the plurality of pieces of auxiliary content included in the auxiliary content group 114. The plurality of styles that are set are stored in the moving image composition style group 113. Examples of the styles will be described later.

The style determining unit 102 determines one of the plurality of styles included in the moving image composition style group 113 in accordance with which an advertisement moving image is to be generated. In other words, the style determining unit 102 selects, from the moving image composition style group 113, a style to be used to generate an advertisement moving image. This determination may be performed by an operator of the information processing apparatus 10, or may be performed in accordance with a scenario or the like preset in the information processing apparatus 10. The style determining unit 102 outputs information about the selected style to the moving image generating unit 103.

The moving image generating unit 103 generates an advertisement moving image in accordance with the style selected by the style determining unit 102. The advertisement moving image is generated in accordance with the selected style and by using various types of information stored in the moving image information storing unit 110.

The providing unit 104 provides (distributes) the advertisement moving image generated by the moving image generating unit 103 to at least one of the user apparatuses 11-1 to 11-N. In the present embodiment, the style determining unit 102 sequentially selects different styles from the moving image composition style group 113, and in response to this, the moving image generating unit 103 sequentially generates different advertisement moving images, and the providing unit 104 provides each of the advertisement moving images to at least one of the user apparatuses 11-1 to 11-N. The user apparatuses 11 receiving the advertisement moving images display the advertisement moving images on the display units thereof.

For the plurality of different advertisement moving images provided by the providing unit 104, the score acquiring unit 105 receives indices (effectiveness indices) indicating the advertising effect, and acquires scores corresponding to the effectiveness indices. This acquisition may also include calculation processing. Here, the calculation processing may be rule-based processing for uniquely calculating scores or processing for estimating scores using some model such as a machine learning model, and the mode in which the calculation processing is executed is not limited.

Here, examples of the effectiveness indices and the scores will be described. An effectiveness index is an index indicating the advertising effect relating to an advertisement moving image, and is an index indicating the advertising effect with respect to a user. For example, the conversion rate (CVR) or the click through rate (CTR) is used as the effectiveness index. CVR is an index indicating the ratio of clicks (select operations) that resulted in conversion (a final outcome such as the purchase of a product or a request for documents) to the number of clicks (select operations)

performed on an advertisement link (operating link). Furthermore, CTR is an index indicating the ratio of users who performed clicks to the users to which an advertisement was displayed. Furthermore, an operating link is a portion that triggers a jump to a website corresponding to a predetermined Uniform Resource Locator (URL) when selected and clicked, and is also referred to hereinafter as an active link. Here, an active link may also indicate an object corresponding to the above-described predetermined URL.

In the present embodiment, an active link may be displayed in an advertisement moving image played back on the user apparatus 11 or in the vicinity of the moving image. If CVR is adopted as the effectiveness index, CVR is derived as the ratio of the number of times an active link is clicked to purchase a target item to the number of clicks on the active link performed by the users of the user apparatuses 11. If CVR is adopted as the effectiveness index, the score acquiring unit 105 can directly use CVR as a score.

Alternatively, the effectiveness index may be an index based on the user viewing time of an advertisement moving image played back on the user apparatus 11. If it is difficult to acquire information of the viewing time on the information processing apparatus 10 side, the viewing time may be approximated by the display time of the advertisement moving image played back on the user apparatus 11. While various types of information other than the advertisement moving image may also be displayed on the display unit of the user apparatus 11, it is a reasonable approach to approximate the viewing time by the time for which a screen displaying the advertisement moving image was displayed on the display unit. If viewing time is used as the effectiveness index, the score acquiring unit 105 may set a predetermined maximum time that is no longer than the maximum possible advertisement moving image length, and calculate, as a score, the ratio of the viewing time (display time) to the maximum time.

The attribute acquiring unit 106 acquires attributes (information indicating attributes) of the users 1 to N of the user apparatuses 11-1 to 11-N. The attributes (user attributes) refer to at least some of: demographic attributes such as sex, age, annual income, educational background, and place of residence; psychographic attributes such as hobbies and preferences; behavioral attributes such as past Internet search history, viewing history, and purchase history; registration information by a specific application; etc.

The estimating unit 107 estimates the most-suitable style for a user based on the scores acquired by the score acquiring unit 105 and the attributes of the users acquired by the attribute acquiring unit 106. The processing by the estimating unit 107 will be described later.

Next, the data stored in the image content group 111, the music content group 112, and the moving image composition style group 113 in the moving image information storing unit 110 will be described with reference to FIG. 3A to 3C.

Figure 3A:
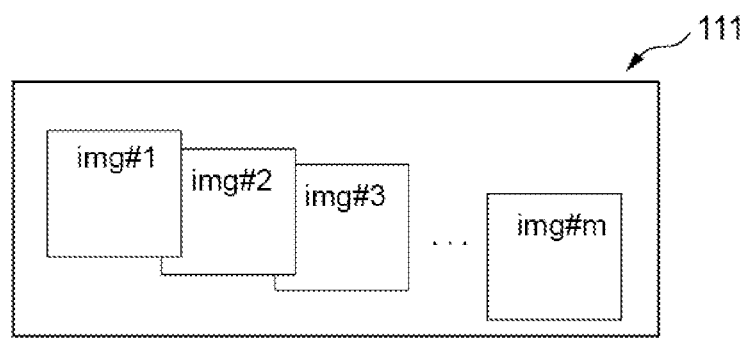
FIG. 3A illustrates an example of data stored in a moving image information storing unit 110.

FIG. 3A illustrates an example of the plurality of pieces of image content included in the image content group 111. Since a case in which advertisement moving images relating to one predetermined item are generated is considered in the present embodiment, a plurality of pieces of image content relating to the predetermined item are included in the image content group 111. For example, if the item is a travel product, the image content group 111 includes pieces of image content such as scenery images, images of the exterior and interior of a hotel, and images of meals served at the hotel, etc.

In FIG. 3A, an example is illustrated in which the image content group 111 includes m (>1) pieces of image content ("img"), and the individual pieces of image content are identified by "#1" to "#m". As described above, each piece of image content may include a still image and/or a moving image. Furthermore, each piece of image content may include text information. The pieces of image content may be in any data format, such as JPEG, BMP, GIF, or MPEG4.

In the present embodiment, the pieces of image content in the image content group 111 may be associated with information relating to objects detected by a predetermined object detection model. Here, the objects refer to objects of various types, such as people, animals, plants, food and beverages, structures, and landscapes, for example. Furthermore, the pieces of image content may each be associated with an image editing parameter such as a color tone parameter. Also, the pieces of image content may each be associated with an image evaluation score, such as an aesthetics score that is a result of an evaluation performed by means of an aesthetics evaluation model or the like.

In the present embodiment, the pieces of image content serving as the image content group 111 may be pieces of image content constituting one or more webpages corresponding to the one predetermined item described above. That is, advertisement moving images generated in the present embodiment correspond to advertisement moving images generated by using, as materials therefor, pieces of content constituting webpages of an item, for example. If the item is an accommodation service relating to an accommodation facility such as a hotel, the pieces of image content constituting the webpages may be pieces of image content indicating the interior or exterior of the accommodation facility, may be pieces of image content indicating food and beverages served in the accommodation service, and may be pieces of image content indicating sceneries relating to the accommodation service. The image content group 111 in the present embodiment may include pieces of image content extracted from webpages that are described and structured based on a markup language such as the HyperText Markup Language (HTML), and may include pieces of image content cut out from screenshots or the like of webpages, and the form of image content is not limited. Here, the text information that may be included in the pieces of image content indicates text information that is described or the like in the webpages including the pieces of image content, for example. In the present embodiment, the image content group 111 may be constituted from a plurality of pieces of image content that are unique to the webpages relating to the item, or may be constituted from a plurality of pieces of content relating to two or more different items that have some kind of item attribute, such as price, place, or category in common. Here, the image content group 111 may be associated with the item and/or the item attribute.

Figure 3B:
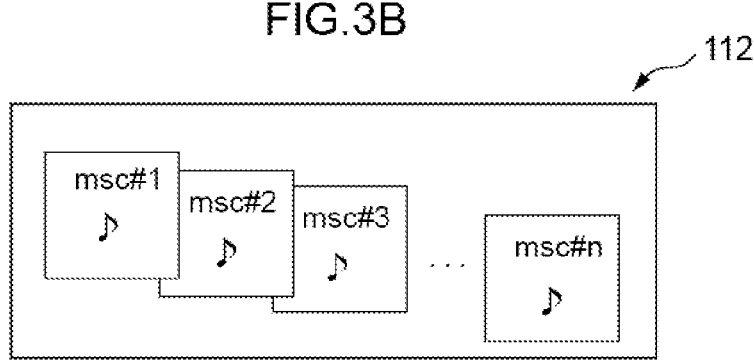
FIG. 3B illustrates an example of data stored in a moving image information storing unit 110.

FIG. 3B illustrates an example of the plurality of pieces of music content included in the music content group 112. In FIG. 3B, an example is illustrated in which the music content group 112 includes n (>1) pieces of music content ("msc"), and the individual pieces of music content are identified by "#1" to "#n". Note that, in another embodiment, the music content group 112 may be configured to include only one piece of music content. As described above, the pieces of music content may be in the form of music files such as MP3 or AAC music files. In the present embodiment, similarly to the image content group 111, the music content group 112 may be pieces of image content constituting the webpages relating to the item, or may be a plurality of pieces of music content that are not correlated with the webpages of the item.

FIG. 3C illustrates examples of the styles included in the moving image composition style group 113. In the present embodiment, the styles are set by the style setting unit 101. Note that the styles may be preset in the information processing apparatus 10.

For example, the styles according to the present embodiment include the following settings (1) to (9). Each of the styles are individually formed by combining two or more of these settings.

(1) Image Selection

The present setting is a setting for selecting two or more pieces of image content constituting an advertisement moving image to be generated from the plurality of pieces of image content included in the image content group 111. Specifically, pieces of information identifying two or more pieces of image content are selected.

With reference to FIG. 3A, "img #1", "img #3", and "img #4" are set in the example of a first style.

In the present embodiment, an example in which a combination of specific pieces of image content is selected as images in a style is described. However, the selection of images may be performed such that a combination of pieces of image content exhibiting a predetermined trend is designated from the image content group 111. For example, the selection of images may be that in which pieces of image content indicating a specific object are designated. Specifically, the selection of images may be that in which pieces of image content indicating objects of one or more specific types among various types such as people, animals, plants, food and beverages, structures, and landscapes are designated. Furthermore, specifically, in a case in which pieces of image content indicating objects that are food and beverages are designated, pieces of image content indicating specific foods or beverages, such as Japanese cuisine, may be designated in the selection of images. Here, the fineness of the classification of the objects in the pieces of image contents designated in the selection of images is not limited. Also, for example, the selection of images may be that in which pieces of image content exhibiting specific image editing parameters are designated. Specifically, the selection of images may be that in which pieces of image content exhibiting image editing parameters, such as color tone parameters, density parameters, exposure parameters, or contrast parameters, within a predetermined range are designated. Furthermore, for example, the selection of images may be that in which pieces of image content for which image evaluation scores output by a machine learning model for evaluating pieces of image content have high values are designated. Specifically, the selection of images may be that in which pieces of image content having image evaluation scores, such as aesthetics scores or saliency scores, exceeding a predetermined threshold are designated. Note that, in a case in which there are a plurality of pieces of image content that are candidates of pieces of image content exhibiting a predetermined trend, pieces of image content may be designated in the selection of images by combining a plurality of trends among these various trends. Specifically, for example, in a case in which there are a plurality of candidates of pieces of image content indicating an object of a specific type, pieces of image content for which the value of some image evaluation score, such as an aesthetics score, is high may be designated in the selection of images. Note that, in the selection of images, a combination of a plurality of pieces of image content for which the image similarity score between the pieces of image content is lowest may be designated. Here, the image similarity score may be a result of an image similarity evaluation performed on two pieces of image content by a machine learning model, and may be a result of the image similarity evaluation performed by rule-based processing.

(2) Image Order

The present setting is a setting regarding the playback order of the two or more pieces of image content in an advertisement moving image constituted from two or more pieces of image content selected in setting (1).

The order "img #1", "img #4", "img #3" is set to the present setting in the example of the first style.

In the present embodiment, the order of a plurality of specific pieces of image content is described as an example of the order of images in a style. However, an order based on the above-described trend may be designated.

(3) Target Moving-Image Length

The present setting is a setting regarding the playback duration of the entire advertisement moving image constituted from the two or more pieces of image content selected in setting (1).

"30 sec (seconds)" is set to the present setting in the example of the first style.

(4) Target Time Per Image Content

The present setting is a setting regarding the playback time set for each of the two or more pieces of image content selected in setting (1).

"10 sec" is set to the present setting in the example of the first style. The same playback time is set for each piece of image content to be played back (30 sec for the three pieces of image content) in the example of the first style. However, different playback times may be set.

(5) Mode of Transition Between Pieces of Image Content

The present setting is a setting regarding an effect to be applied during switching of playback (display) between the two or more pieces of image content selected in setting (1). For example, as the transition mode, there are modes such as a blend mode (also referred to as fading or dissolving; the tones of an earlier image and a later image are blended according to a predetermined method), a blackout mode, a whiteout mode, and a wipe mode (mode in which an image switches to another image as though it is wiped).

"Blend Mode" is set to the present setting in the example of the first style.

(6) Display of Related Text and/or Graphics

The present setting is a setting regarding the display of text information and/or graphics relating to the item that is to be displayed together when playing back the advertisement moving image constituted from the two or more pieces of image content selected in setting (1). The related text information and/or graphics differs from the text information (e.g., item information) included in the pieces of image content, and for example is image information indicating a logo of an award received in relation to the target item, etc. The related text information and/or graphics may be included in the image content group 111 as image content. "No" or "Yes" is set in the present setting. If the present setting is "Yes", information identifying the image content in the image content group 111 may also be set.

"No" is set to the present setting in the example of the first style.

(7) Setting Regarding Initial Image and/or Final Image of Advertisement Moving Image The present setting is a setting regarding the initial image (so-called intro or opening) and/or the final image (so-called outro or ending) of the advertisement moving image constituted from the two or more pieces of image content selected in setting (1). For example, the initial image may be an image for providing an overview of the advertisement moving image. Furthermore, the final image may be an image for indicating the end of the advertisement moving image. The initial image and the final image may each be a still image or a moving image. Furthermore, the initial image and the final image may be configured so as to be played back together with music that is the same as or is different from that of the advertisement moving image to be generated. "No" or "Yes" is set in the present setting. If the present setting is "Yes", information identifying image content in the image content group 111 may also be set. Furthermore, if the present setting is "Yes", information identifying music content in the music content group 112 may also be set.

"No" is set to the present setting in the example of the first style.

(8) Selection of Music

The present setting is a setting for selecting one of the pieces of music content (musical pieces) included in the music content group 112 that is to be played back together with the advertisement moving image constituted from the two or more pieces of image content selected in setting (1). Specifically, identification information of the music content is selected. Switching of musical pieces may be performed during the playback of the advertisement moving image, and thus a plurality of pieces of identification information may be selected. In this case, the playback time of each musical piece may also be set.

With reference to FIG. 3A, "msc #1" is set in the example of the first style.

(9) Inclusion/Non-Inclusion of Active Link in Advertisement Moving Image

The present setting is a setting regarding an active link to be displayed during the playback of the advertisement moving image constituted from the two or more pieces of image content selected in setting (1). The active link may be displayed inside or outside a frame in which the advertisement moving image is played back. Furthermore, the active link may be displayed over the entire duration of playback, or may be displayed at a specific timing. The active link may be a link to a website that is for purchasing (signing up for) the tangible or intangible product or service being advertised or that is related to the purchase. "Not Included" or "Included" is set in the present setting. If "Included" is set to the present setting, a predetermined active link to the target item is also set. Furthermore, the timing when the active link is to be displayed (information identifying image content or the timing in playback time) may also be set. If a timing when the active link is to be displayed is not set, the active link may be displayed over the entire duration of playback.

"Included" and a predetermined link to the target item are set in the example of the first style. Furthermore, image content information "img #3" is set as the timing when the link is to be displayed.

FIG. 4 is a schematic diagram of playback of the advertisement moving image generated by the moving image generating unit 103 in a case in which the first style illustrated in FIG. 3C is selected by the style determining unit 102.

With reference to the first scenario in FIG. 3C, pieces of image content are played back in the order of "img #1", "img #4", and "img #3", and the piece of music content "msc #1" is also played back. The playback time of each piece of image content is 10 sec, and the playback time of the entire advertisement moving image is 30 sec. Also, the advertisement moving image is configured so that switching between the pieces of image content is performed in the blend mode. Furthermore, the advertisement moving image is configured so that an active link to the target item is displayed during playback of the piece of image content "img #3". Note that the active link is not limited to the form as illustrated in FIG. 4 in which the active link is displayed as a character sequence, and may be configured so that a jump to the link destination indicated by the link is triggered when a portion within the image area of "img #3" is selected by a user.

[Hardware Configuration of Information Processing Apparatus 10]

Figure 5:
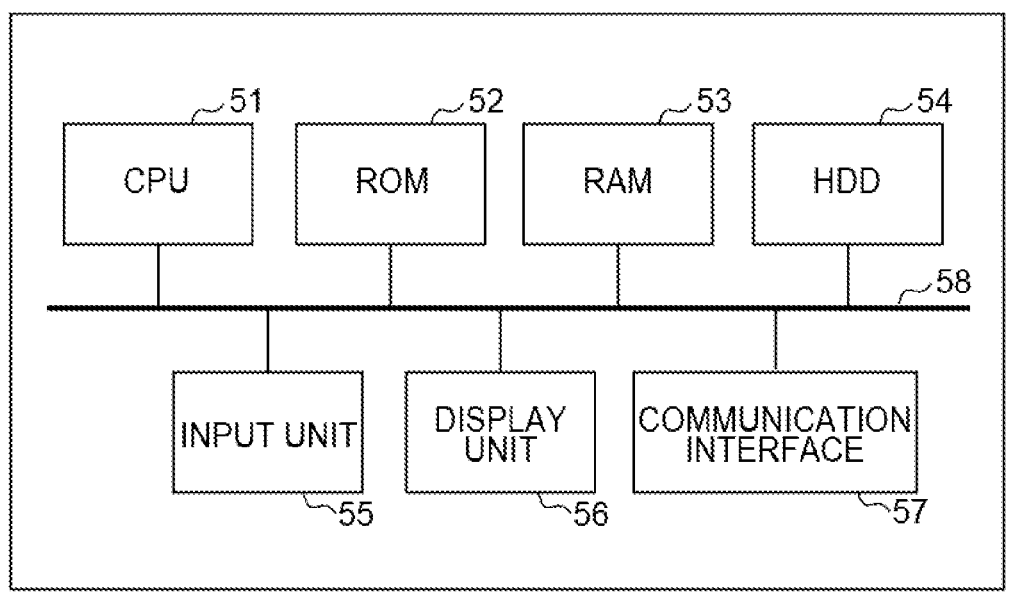
FIG. 5 illustrates an example of a hardware configuration of the information processing apparatus 10 and user apparatuses 11.

FIG. 5 is a block diagram illustrating one example of a hardware configuration of the information processing apparatus 10 according to the present embodiment.

The information processing apparatus 10 according to the present embodiment can be implemented on one or more computers or mobile devices of any type, or on other processing platforms of any type.

With reference to FIG. 5, an example in which the information processing apparatus 10 is implemented on a single computer is illustrated. However, the information processing apparatus 10 according to the present embodiment may be implemented on a computer system including a plurality of computers. The plurality of computers may be connected so as to be capable of communicating with one another via a wired or wireless network.

As illustrated in FIG. 5, the information processing apparatus 10 may include a CPU 51, a ROM 52, a RAM 53, an HDD 54, an input unit 55, a display unit 56, a communication interface 57, and a system bus 58. The information processing apparatus 10 may also be provided with an external memory.

The CPU (central processing unit) 51 integrally controls the operations in the information processing apparatus 10, and controls the constituent units (52 to 57) via the system bus 58, which is a data transmission path.

The ROM (read-only memory) 52 is a non-volatile memory that stores a control program, etc., that are necessary for the execution of processing by the CPU 51. Note that the program may be stored in a non-volatile memory such as the HDD (hard disk drive) 54 or an SSD (solid-state drive), or an external memory such as a detachable storage medium (unillustrated).

The RAM (Random Access Memory) 53 is a volatile memory, and functions as the main memory, work area, etc., of the CPU 51. That is, upon executing processing, the CPU 51 loads the necessary program and the like from the ROM 52 to the RAM 53, and realizes various functional operations by executing the program and the like. The ROM 52 or the RAM 53 may include the moving image information storing unit 110 illustrated in FIG. 2.

For example, the HDD 54 stores various types of data, information, etc., that are necessary when the CPU 51 performs processing using the program. Furthermore, for example, various types of data, information, etc., that are obtained by the CPU 51 performing processing using the program and the like are stored in the HDD 54.

The input unit 55 is constituted by a keyboard and a pointing device such as a mouse.

The display unit 56 is constituted by a monitor of a liquid-crystal display (LCD) or the like. By being configured to be combined with the input unit 55, the display unit 56 may function as a graphical user interface (GUI).

The communication interface 57 is an interface that controls the communication between the information processing apparatus 10 and external apparatuses.

The communication interface 57 provides an interface to a network, and executes communication with external apparatuses via the network. Various types of data, parameters, etc., are transmitted to and received from external apparatuses via the communication interface 57. In the present embodiment, the communication interface 57 may execute communication via a dedicated line or a wired local area network (LAN) conforming to a communication standard such as Ethernet (registered trademark). However, the network that can be used in the present embodiment is not limited to this, and may be constituted by a wireless network. Examples of this wireless network include wireless personal area networks (PANs) such as Bluetooth (registered trademark), ZigBee (registered trademark), and UWB (ultra wideband). Examples also include wireless local area networks (LANs) such as Wireless Fidelity (Wi-Fi) (registered trademark), and wireless metropolitan area networks (MANs) such as WiMAX (registered trademark). Examples further include wireless wide area networks (WANs) such as LTE, 3G, 4G, and 5G. Note that it is sufficient that the network connect devices so as to be capable of communicating with one another and allow communication to be performed, and the standard, scale, and configuration of communication are not limited to those described above.

The functions of at least some of the elements of the information processing apparatus 10 illustrated in FIG. 5 can be realized by the CPU 51 executing the program. However, a configuration may be adopted such that the functions of at least some of the elements of the information processing apparatus 10 illustrated in FIG. 5 operate as dedicated pieces of hardware. In this case, the dedicated pieces of hardware operate based on control by the CPU 51.

[Hardware Configuration of User Apparatus 11]

The hardware configuration of the user apparatus 11 illustrated in FIG. 1 may be similar to that in FIG. 5. That is, the user apparatus 11 may include a CPU 51, a ROM 52, a RAM 53, an HDD 54, an input unit 55, a display unit 56, a communication interface 57, and a system bus 58. The user apparatus 11 displays various types of information provided from the information processing apparatus 10 on the display unit 56, and can perform processing corresponding to input operations received from a user 1 via the GUI (constituted by the input unit 55 and the display unit 56).

[Flow of Processing]

FIG. 6 illustrates a flowchart of processing executed by the information processing apparatus 10 according to the present embodiment. The processing illustrated in FIG. 6 may be realized by the CPU 51 of the information processing apparatus 10 loading the program stored in the ROM 52 or the like to the RAM 53 and executing the program.

In step S601, the style setting unit 101 sets (generates) a plurality of styles using at least one of the plurality of pieces of image content included in the image content group 111 and trends therein, the plurality of pieces of music content included in the music content group 112, and the plurality of pieces of auxiliary content included in the auxiliary content group 114. The first style and second style, which are examples of the styles, are as illustrated in FIG. 3C. The style setting unit 101 stores the plurality of styles to the moving image composition style group 113. For example, the style setting unit 101 can set the plurality of styles in accordance with settings made by the operator of the information processing apparatus 10 or in accordance with a scenario or the like preset in the information processing apparatus 10. Note that the plurality of styles may be preset in the information processing apparatus 10, and in this case, the processing in step S601 for setting the plurality of styles is skipped.

In addition, in step S601, the attribute acquiring unit 106 acquires attributes of the users of the user apparatuses 11-1 to 11-N.

In step S602, the style determining unit 102 selects (determines) one style from the plurality of styles included in the moving image composition style group 113. This selection may be performed by the operator of the information processing apparatus 10, or may be performed in accordance with a scenario or the like preset in the information processing apparatus 10.

In step S603, the moving image generating unit 103 generates an advertisement moving image in accordance with the style selected by the style determining unit 102. In the example of the first style in FIG. 3C, an advertisement moving image according to the image illustrated in FIG. 4 is generated, for example. The generated advertisement moving image may be temporarily stored in a storage unit such as the RAM 53, or may be recorded in a storage unit such as the ROM 52.

In step S604, the providing unit 104 provides (distributes) the advertisement moving image generated by the moving image generating unit 103 to at least one of the user apparatuses 11-1 to 11-N. In the present embodiment, the providing unit 104 provides the advertisement moving image generated by the moving image generating unit 103 to one or more user apparatuses, rather than to all of the user apparatuses 11-1 to 11-N illustrated in FIG. 1. The one or more user apparatuses to which each moving image is to be provided may be randomly selected each time a moving image is provided. Alternatively, the one or more user apparatuses to which each moving image is to be provided may be selected by the operator of the information processing apparatus 10, or may be selected in accordance with a scenario or the like preset in the information processing apparatus 10.

In step S605, the providing unit 104 determines whether or not all of the advertisement moving images that are in accordance with the plurality of styles generated in step S601 have been provided to user apparatuses 11. If not all of the advertisement moving images that are in accordance with the plurality of styles have been provided to user apparatuses 11 (NO in step S605), the information processing apparatus 10 repeats the processing in steps S602 to S604. If all of the advertisement moving images that are in accordance with the plurality of styles have been provided to user apparatuses 11 (YES in step S605), processing proceeds to step S606.

Note that, in the provision of the advertisement moving images to user apparatuses 11 in step S604, the providing unit 104 may sequentially provide the advertisement moving images, or may simultaneously provide the advertisement moving images that are in accordance with the plurality of styles generated in step S601.

In the present embodiment, the advertisement moving images are each provided to some apparatuses, rather than to all of the user apparatuses 11-1 to 11-N, as described above. For example, if there are one-hundred advertisement moving images in different styles, the providing unit 104 does not provide the one-hundred advertisement moving images to all of the user apparatuses 11-1 to 11-N, and instead provides each of the moving images to one or more user apparatuses selected from the user apparatuses 11-1 to 11-N.

After all of the advertisement moving image that are in accordance with the plurality of styles generated in step S601 have been provided to user apparatuses 11, in step S606, the score acquiring unit 105 acquires scores on the basis of effectiveness indices from the user apparatuses 11-1 to 11-N, and generates a score table in which the acquired scores are registered. In the present embodiment, the maximum score is 1, and the higher the score, the higher the advertising effect.

FIG. 7A illustrates an example of the score table. The score table illustrated in FIG. 7A indicates scores with respect to different styles (first style 71-1 to Sth style 71-S (S>1)) for users of user apparatuses. As described above, the providing unit 104 provides each one of advertisement moving images in different styles to one or more of the user apparatuses 11-1 to 11-N in step S604, and scores are acquired in step S606. For each style, scores are acquired from some apparatuses rather than from all of the user apparatuses 11-1 to 11-N, and thus scores are sparsely present in the score table.

After scores for all styles (first style 71-1 to Sth style 71-S) have been acquired and the score table has been generated, the estimating unit 107 determines a target user in step S607. Below, the user apparatus determined in step S607 is referred to as a user apparatus 11-C, and the user of the user apparatus 11-C is referred to as a user C.

In step S607, the estimating unit 107 further determines a user group that forms a base of supplementation processing in step S608 is performed. Specifically, the estimating unit 107 generates a group by selecting a plurality of users from the users 1 to N of the user apparatuses 11-1 to 11-N illustrated in FIG. 1 based on the attributes of the users acquired by the attribute acquiring unit 106 in step S601. In the present embodiment, the estimating unit 107 generates one group (referred to as a group C) by grouping a plurality of users having attributes that are similar to (or are the same as) the attributes of the user C. When the attributes of the above-described user are expressed as a feature vector, the similar attributes correspond to feature vectors included within a predetermined range in a feature space in which feature vectors are distributed.

Attributes can be classified from coarse classifications (e.g., sex) to fine classifications (e.g., preferences specified from purchase histories of specific items). The coarser the attribute granularity in the grouping, the more users in the generated user group, and the finer the attribute granularity in the grouping, the more similar the attributes of the plurality of users in the generated user group are to the individual attributes of the user C. That is, the size of the group changes. The granularity in the grouping may be preset in the information processing apparatus 10, or may be determined by machine learning. The coarsest group in the present embodiment is the one entire group including all of the users corresponding to the user apparatuses 11-1 to 11-N. Note that the grouping in the present embodiment may be performed by performing clustering based on a known method.

Subsequently, in step S608, the score table is supplemented by supplementing (deriving) scores for styles for which scores have not been acquired from a user C determined in step S607 based on scores acquired from users belonging to the group C generated in step S607. The supplementation processing will be described later with reference to FIG. 7B.

After supplementing the score table, the estimating unit 107, in step S609, determines the style having the highest score for the user C, and estimates the style corresponding to the highest score as the most-suitable style for the user C.

In step S610, the moving image generating unit 103 generates an advertisement moving image in accordance with the most-suitable style estimated in step S609, and the providing unit 104 provides the generated advertisement moving image to the user apparatus 11-C (or to the user apparatuses of the plurality of users belong to the group C). Note that, if the advertisement moving image in accordance with the most-suitable style has already been generated and is stored in a storage unit such as the RAM 53, the providing unit 104 may read the target advertisement moving image from the storage unit and provide the advertisement moving image to the user apparatus 11-C.

Next, the processing in steps S607 to S609 in FIG. 6 will be described with reference to FIG. 7B. FIG. 7B is a score table similar to FIG. 7A and is for describing the processing in steps S607 to S609. Here, an example in which the most-suitable style for the user C, who is the user determined in step S607, is determined will be described. As described above, in step S607, the estimating unit 107 determines the user group C based on the attributes of the users. In the example in FIG. 7B, the group C including the user C and the users 1 to 3 is generated.

In subsequent step S608, the estimating unit 107 supplements the score table with respect to the user C. First, for each one of the styles (first style 71-1 to Sth style 71-S), the estimating unit 107 selects, from the users belonging to the group C, a plurality of users who have scores similar to a user C's score. In the example in FIG. 7B, for the first style 71-1, the estimating unit 107 selects the users 1 and 3 by checking a user 1's score (=0.67) and a user 3's score (=0.73), which are similar to the user C's score (=0.7). The range of scores that are specified as being similar to the user C's score can be set as appropriate.

Then, for the users 1 and 3 who have been selected, the estimating unit 107 specifies, from the styles other than the first style 71-1, a style for which the users 1 and 3 have similar scores. In the example in FIG. 7B, the third style 71-3 is specified. Because there is no score for the user C for the third style 71-3, the estimating unit 107 calculates (estimates) and supplements the user C's score using the user 1's score (=0.3) and the user 3's score (=0.4). In the present embodiment, 0.35 is calculated as the average of the user 1's score and the user 3's score.

The estimating unit 107 supplements the score table with respect to the user C by performing such supplementation processing for all of the styles.

The processing for supplementing a score for a user in the present embodiment may be performed based on a statistical value of scores of other users belonging to the same group as the user. For example, the statistical value may be the average, the median, or the mode, and there is no limitation on the form of the statistical value as long as the statistical value is some value corresponding to a commonly used statistical index. Furthermore, the supplementation processing may be based on the similarity of attribute feature vectors of a user and other users. Specifically, for example, the supplementation processing may be processing in which, based on a commonly used similarity, such as the cosine similarity, in attribute feature vectors between a user and other users, the scores of the other users are corrected. Here, in place of the attributes of a user, attributes of a group to which the user belongs may be used, the group being included in groups of the users corresponding to the user apparatuses 11-1 to 11-N. In this case, values obtained by correcting statistical values of other groups may be adopted as scores for a user. Furthermore, here, the scores of the other users or other groups that are corrected may lie within a predetermined range, and a score for a user may be determined within a range in which the scores of a plurality of different other users or other groups that are corrected overlap one another. Note that this correction processing may be based on a statistical value of the scores of the other users or other groups that are corrected.

After supplementing the score table, the estimating unit 107 estimates the style having the highest score for the user C as the most-suitable style for the user C. In the example in FIG. 7B, a score for the third style 71-3 has been added. However, the estimating unit 107 estimates that the first style 71-1 is the most-suitable style for the user C because the score for the first style 71-1 is higher than that for the third style 71-3 and indicates the highest score for the user C in the score table in FIG. 7B.

In such a manner, while the score table generated from scores based on the effectiveness indices acquired from the user apparatuses 11-1 to 11-N is a score table in which scores are sparsely present, scores for a target user C are supplemented using other scores. Furthermore, the estimating unit 107 estimates, as the most-suitable style for the user C, a style corresponding to the highest score from the final scores that are generated.

The first embodiment has been described up to this point. According to the present embodiment, the most-suitable style for a user can be estimated based on scores acquired as responses when a plurality of advertisement images in accordance with a plurality of styles are provided to some user apparatuses; i.e., the estimation of the most-suitable style can be performed without providing the advertisement images to all users. Thus, an advertisement moving image personalized to the user can be provided, and the advertising effect is improved to a further extent.

Second Embodiment

In the first embodiment, the most-suitable style for a user is estimated and determined from a plurality of styles based on scores and user attributes. In the present embodiment, a method will be described in which, based on a style, image content, and user attributes, a score for the style is estimated using machine learning.

The differences of the present embodiment from the first embodiment will be described below.

Figure 8:
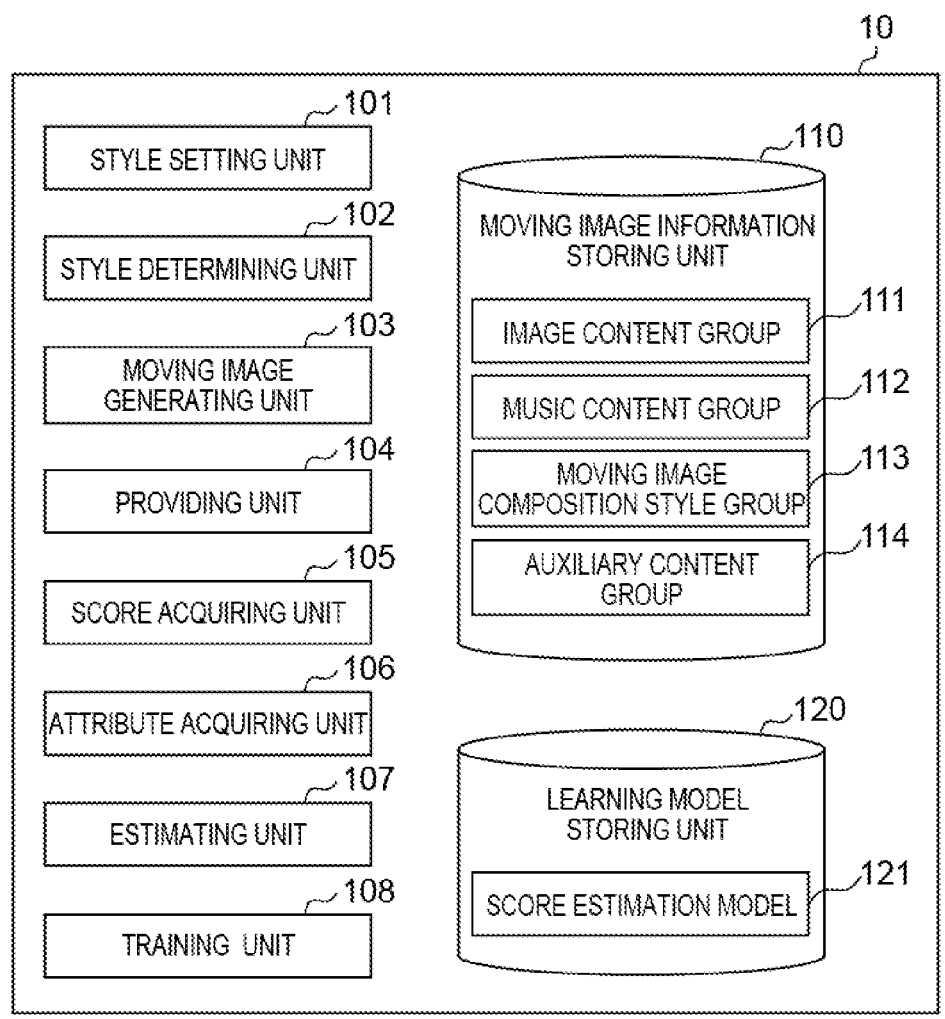
FIG. 8 illustrates an example of a functional configuration of the information processing apparatus 10 according to a second embodiment.

FIG. 8 illustrates a functional configuration of the information processing apparatus 10 according to the present embodiment. Compared to FIG. 1, there is a difference in that a training unit 108 and a learning model storing unit 120 are added. The training unit 108 trains a score estimation model 121 using styles and scores as training data, and stores the trained learning model to the learning model storing unit 120. Combinations of styles and scores can be acquired or estimated according to the method described in the first embodiment. Furthermore, the training unit 108 can continue training the score estimation model 121 using batches of the training data and update the score estimation model 121. The ROM 52 or the RAM 53 may include the learning model storing unit 120.

Figure 9:
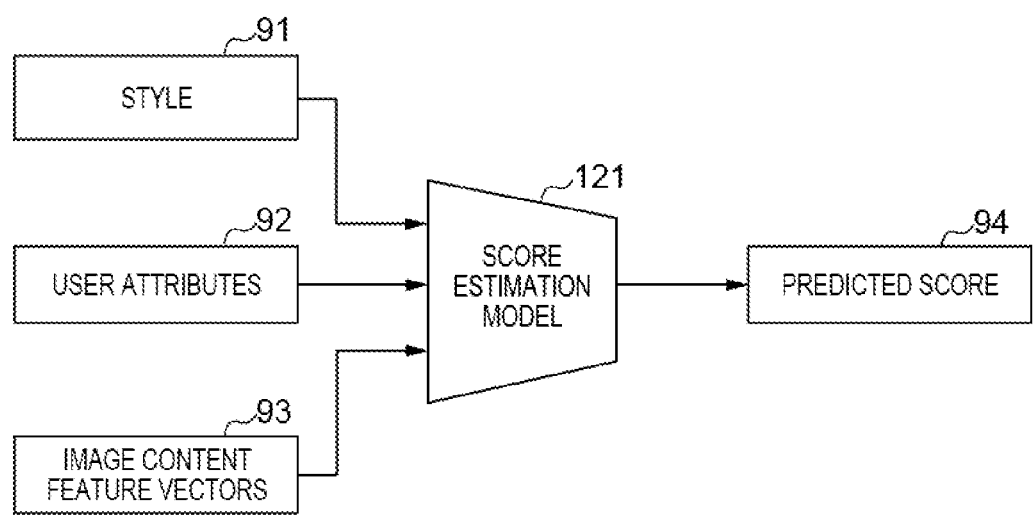
FIG. 9 illustrates an example of a configuration of a training unit 108.

FIG. 9 illustrates an example of a configuration of the training unit 108. The training unit 108 acquires a style 91, user attributes 92, and image-content feature vectors 93, inputs the acquired information to the score estimation model 121, and outputs a score 94.

The style 91 is information identifying a style selected from the plurality of styles included in the moving image composition style group 113.

The user attributes 92 are information indicating user attributes acquired by the attribute acquiring unit 106. Note that the user attributes 92 may be attributes of one individual user, or may be attributes (group attributes) of a group of a plurality of users having similar attributes. When attributes are expressed as feature vectors, the similar attributes correspond to feature vectors included within a predetermined range in a feature space in which the feature vectors are distributed.

The image-content feature vectors 93 are feature vectors indicating features of pieces of image content included in the image content group 111. The feature vectors 93 may be extracted by the training unit 108 itself applying pieces of image content to a convolutional neural network (CNN) such as Resnet, VGG-16, or VGG-19.

As illustrated in FIG. 9, the score estimation model 121 receives a style 91, user attributes 92, and image-content feature vectors 93 as input, and outputs a score 94 for the style 91. The score estimation model 121 may be constituted by a neural network such as a CNN having appropriate depth.

The estimating unit 107 can determine the most-suitable style for a user (or a user group) using scores 94 output (predicted) using the score estimation model 121. For example, the estimating unit 107 may acquire a plurality of scores that correspond to a plurality of styles and that are output by the training unit 108 with respect to user attributes 92, and estimate the style corresponding to the highest score among the plurality of scores as the most-suitable style for a user (or a user group) corresponding to the user attributes 92. Alternatively, the output scores may be input to the score table described in the first embodiment, and the estimating unit 107 may estimate the most-suitable style for a user according to the procedure described in the first embodiment. As is the case in the first embodiment, an advertisement moving image generated according to the estimated most-suitable style is provided to a user apparatus.

In such a manner, according to the present embodiment, a score corresponding to a style and user attributes can be predicted (output) by means of machine learning. Furthermore, depending on the attribute granularity of the user attributes 92, a style that is suitable for a target user or a user group can be set. Specifically, if the target is an individual user, a style that is suitable for the individual user can be estimated by setting the granularity of the user attributes 92 so as to be fine. On the other hand, if the target is a user group, a style that is suitable for the user group can be estimated by setting the granularity of the user attributes 92 so as to be course. According to such processing, a style that is in accordance with a given purpose can be determined, and accordingly, an advertisement moving image having a high advertising effect can be provided to a target user (or a user group).

Third Embodiment

In the above-described embodiments, the plurality of styles that are used are preset. Specifically, an example has been described in which a predetermined number of styles (e.g., one hundred styles) are set by the style setting unit 101 or are preset, and the most-suitable style for a user is selected from the styles.

However, it is not necessarily the case that the most-suitable style for a user is one of the plurality of styles that are set. In consideration of this, in the present embodiment, an embodiment in which the style setting unit 101 sets (generates) variations of styles, and replaces (updates) the styles stored in the moving image composition style group 113 based on scores acquired by the score acquiring unit 105 will be described. The differences of the present embodiment from the first and second embodiments will be described below The configuration of the information processing apparatus 10 according to the present embodiment may be similar to the configuration illustrated in FIG. 2 or 8. In the present embodiment, the style setting unit 101 generates variations of styles. For example, the style setting unit 101 generates new styles obtained by applying slight changes, such as changes in transition mode, music, and playback time, to existing styles, and stores the new styles in the moving image composition style group 113. Furthermore, for example, the style setting unit 101 generates new styles obtained by changing the trend and combination of pieces of image content designated by the image order or image selection, and stores the new styles in the moving image composition style group 113.

Subsequently, according to the flow illustrated in FIG. 6 described in the first embodiment, the style determining unit 102 sequentially selects the styles stored in the moving image composition style group 113, the moving image generating unit 103 generates advertisement moving images in accordance with the selected styles, and the advertisement moving images are each provided to at least some of the user apparatuses 11-1 to 11-N. If advertisement moving images in accordance with the plurality of styles that were stored in the moving image composition style group 113 prior to the storing of the new styles that are generated have already been provided, the information processing apparatus 10 may only transmit advertisement moving images in accordance with the new styles. Subsequently, the score acquiring unit 105 acquires scores from effectiveness indices from the user apparatuses to which the advertisement moving images have been provided.

When scores for all of the styles (existing styles and newly set styles) have been acquired by the score acquiring unit 105, the style setting unit 101 compares representative scores of the styles with one other. For example, the representative score may be a statistical value such as the total or average of all scores registered for each style. Then, the style setting unit 101 deletes, from the moving image composition style group 113, a plurality of styles corresponding to a plurality of number of scores counting from the lowest score. In other words, the style setting unit 101 updates the plurality of styles included in the moving image composition style group 113 based on the acquired scores. Note that the predetermined number may be the number of new styles set (generated) by the style setting unit 101.

In such a manner, according to the present embodiment, new variations of styles are generated, and styles with higher scores among the new styles and existing styles remain in the moving image composition style group 113. Thus, the styles stored in the moving image composition style group 113 can be optimized to a further extent.

Figure 10A:
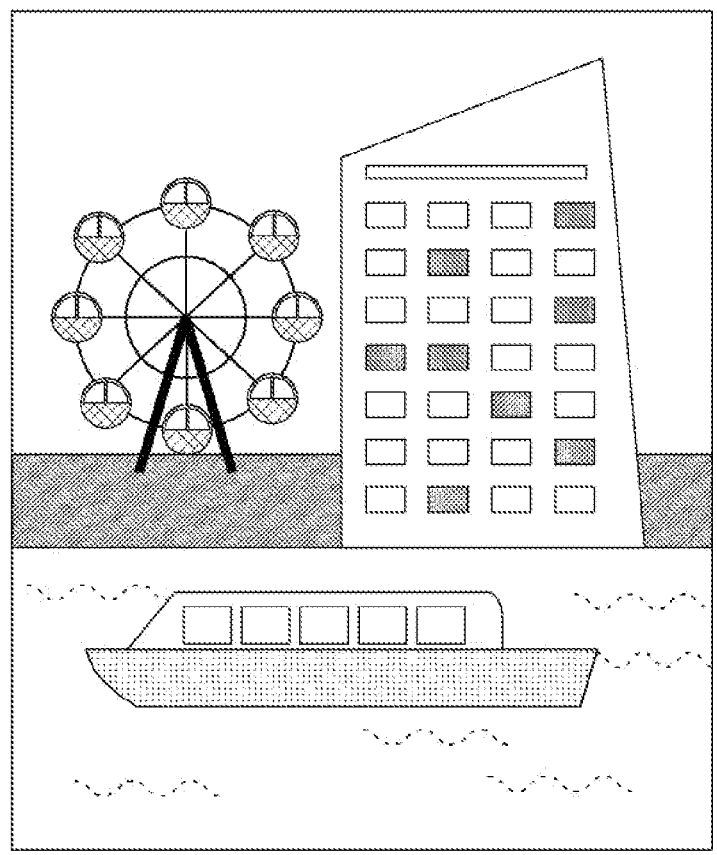
FIG. 10A illustrates an example of pieces of image content having different aspect ratios.
Figure 10B:
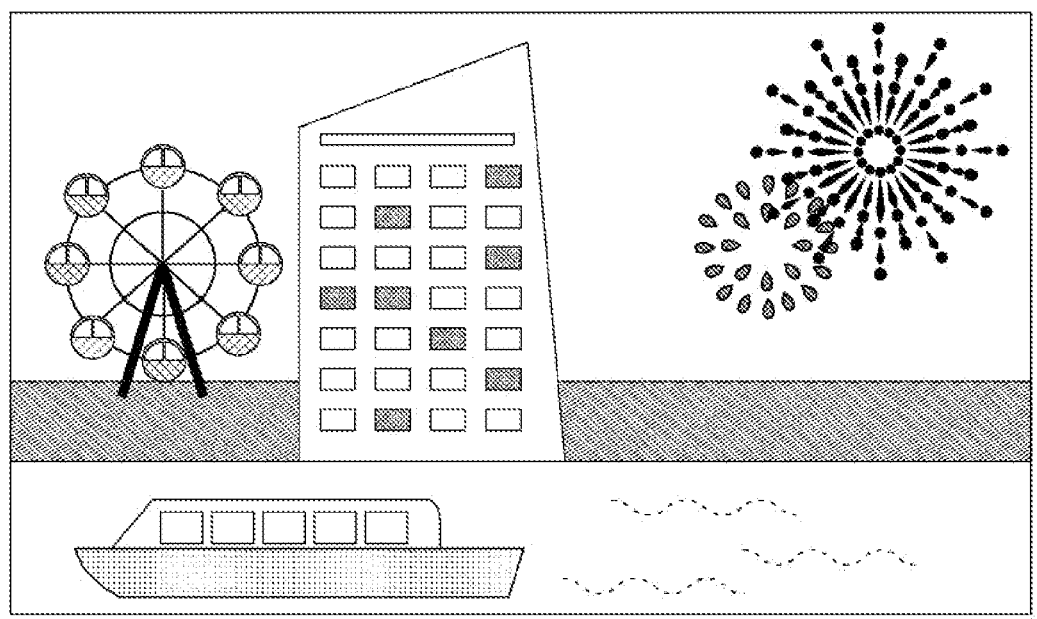
FIG. 10B illustrates an example of pieces of image content having different aspect ratios.

Note that, while the styles described with reference to FIG. 3C were used as the styles to be stored in the moving image composition style group 113 in the above-described embodiments, all other types of styles can be used as styles. For example, image aspect ratios (ratio between the long and short sides of a rectangle) of moving images during display may be used. FIG. 10A and FIG. 10B illustrate examples of pieces of image content having different image aspect ratios. By changing the image aspect ratio, the scene included in an image changes, and the impression that a user viewing the image receives from the image may also change. The image aspect ratio is the "horizontal-vertical" ratio, and is "9:10" and "5:3" in FIG. 10A and FIG. 10B, respectively.

For example, if the target item is a travel product and the pieces of image content include the scenery around a hotel, an image as illustrated in FIG. 10A in which the horizontal and vertical lengths are substantially the same and a building is included at a large size has a high advertising effect with respect to a user interested in buildings. On the other hand, an image as illustrated in FIG. 10B which is longer in the horizontal direction than in the vertical direction and in which the scenery of the sky is included at a large size has a high advertising effect with respect to a user interested in the scenery around the hotel.

In such a manner, according to the above-described embodiments, the most-suitable style for a user or a user group can be estimated, and an advertisement moving image in accordance with the style can be generated and provided. Furthermore, an advertisement targeted to a user or a user group can be provided without obtaining an effectiveness index from the individual user.

In the above-described embodiments, an example in which an advertisement moving image relating to an item (tangible or intangible product, or service) is provided to a user has been described. However, the above-described embodiments are applicable to moving images relating to any item, without limitation to a tangible or intangible product, or service. In other words, the above-described embodiments are applicable to embodiments for providing a moving image which relates to a predetermined item and in which pieces of image content corresponding to the item are used.

Note that, while specific embodiments have been described above, said embodiments are mere examples, and are not intended to limit the scope of the present invention. The apparatus and method disclosed in the present specification may be reduced to practice in embodiments other than those described above. Furthermore, omissions, replacements, and modifications may also be made, as appropriate, to the above-described embodiments without departing from the scope of the present invention. Such embodiments obtained by making omissions, replacements, and modifications are included within the scope of the claims and equivalents thereof, and are included within the technical scope of the present invention.

REFERENCE NUMERALS AND SYMBOLS 1 to N: User
10: Information processing apparatus
11-1 to 11-N: User apparatus
101: Style setting unit
102: Style determining unit
103: Moving image generating unit
104: Providing unit
105: Score acquiring unit
106: Attribute acquiring unit
107: Estimating unit
108: Training unit
110: Moving image information storing unit
111: Image content group
112: Music content group
113: Moving image composition style group
114: Auxiliary content group
120: Learning model storing unit
121: Score estimation model

The invention claimed is:

1. An information processing apparatus comprising:
at least one memory device storing computer program code;
at least one processor configured to execute the computer program code and to cause the information processing apparatus to operate according to the computer program code; and
a communication interface configured to communication with a user apparatus,
wherein the computer program code comprises:
setting code configured to cause at least one of the at least one processor to cause the information processing apparatus to generate a plurality of composition styles that each correspond to a composition of a moving image which relates to a predetermined item and in which a plurality of pieces of image content for the predetermined item are used, and to store the plurality of composition styles in the at least one memory;
acquiring code configured to cause at least one of the at least one processor to cause the information processing apparatus to communicate with the user apparatus through the communication interface and to acquire an attribute of a target user from the user apparatus;
estimating code configured to cause at least one of the at least one processor to cause the information processing apparatus to estimate a most-suitable composition style for the target user from among the plurality of composition styles based on the plurality of pieces of image content and the attribute of the target user; and
image providing code configured to cause at least one of the at least one processor to cause the information processing apparatus to generate a moving image based on the most-suitable composition style and the plurality of pieces of image content and provide the moving image to the user apparatus through the communication interface,
wherein the image providing code is further configured to cause at least one of the at least one processor to cause the information processing apparatus to provide, through the communication interface, each of the moving images corresponding with the respective composition styles of the plurality of composition styles to one or more user devices corresponding to one or more users selected from a plurality of users including the target user,
wherein the estimating code is further configured to cause at least one of the at least one processor to cause the information processing apparatus to acquire, from the one or more user devices, scores indicating an advertising effect from the one or more users for each of the plurality of composition styles, and to estimate the most suitable composition style for the target user based on the scores,
wherein the acquiring code is further configured to cause at least one of the at least one processor to cause the information processing apparatus to acquire attributes of the plurality of users, and
wherein the estimating code is further configured to cause at least one of the at least one processor to cause the information processing apparatus to derive the scores for one or more of the plurality of composition styles for which the scores have not been acquired from the target user using the scores acquired from a group of users from among the one or more users having attributes similar to the attribute of the target user.

2. The information processing apparatus of claim 1, wherein the estimating code is further configured to cause at least one of the at least one processor to cause the information processing apparatus to estimate, as the most-suitable composition style, one of the plurality of composition styles corresponding to the highest score from among the scores.

3. The information processing apparatus of claim 1, wherein the estimating code is further configured to cause at least one of the at least one processor to cause the information processing apparatus to change the size of the group of users in accordance with the attribute of the target user.

4. The information processing apparatus of claim 1, wherein the computer program code further comprises;
selecting code configured to cause at least one of the at least one processor to cause the information processing apparatus to select one of the plurality of composition styles,
wherein the estimating code is further configured to cause at least one of the at least one processor to cause the information processing apparatus to estimate the most-suitable composition style for the target user by based on the selected one of the plurality of styles.

5. The information processing apparatus of claim 4, wherein the estimating code is further configured to cause at least one of the at least one processor to cause the information processing apparatus to extract feature vectors of the plurality of pieces of image content, and output the score for the selected one of the plurality of composition styles by inputting, to a machine learning model, the feature vectors of the plurality of pieces of image content, the selected one of the plurality of composition styles, and the attribute of the target user.

6. The information processing apparatus of claim 1, wherein the setting code is further configured to cause at least one of the at least one processor to cause the information processing apparatus to update the plurality of composition styles in accordance with the scores.

7. The information processing apparatus of claim 1, wherein each of the plurality of pieces of image content is constituted from a still image or a moving image.

8. The information processing apparatus of claim 1, wherein each of the plurality of pieces of image content includes text information regarding the predetermined item.

9. The information processing apparatus of claim 1, wherein each of the plurality of pieces of image content is image content including webpages corresponding to the predetermined item.

10. The information processing apparatus of claim 1, wherein the plurality of composition styles are each formed individually by combining a plurality of settings.

11. The information processing apparatus of claim 10, wherein the plurality of settings include a setting regarding a selection of two or more pieces of image content from the plurality of pieces of image content.

12. The information processing apparatus of claim 11, wherein the plurality of settings include at least one of: a setting regarding a playback order in a moving image constituted from the two or more pieces of image content; a setting regarding a playback duration of the entire moving image constituted from the two or more pieces of image content; a setting regarding a playback time per each of the two or more pieces of image content; a setting regarding a mode of transition between the two or more pieces of image content; a setting regarding display of text information and graphics; a setting regarding the initial image and/or the final image of the moving image constituted from the two or more pieces of image content; a setting regarding music; a setting regarding whether or not an active link is included; and an image aspect ratio to be applied when the moving image constituted from the two or more pieces of image content is displayed.

13. The information processing apparatus of claim 1, wherein the predetermined item is a tangible product, an intangible product, or a service.

14. A method of operating an information processing apparatus, the method comprising:
generating, by the information processing apparatus, a plurality of composition styles that each correspond to a composition of a moving image which relates to a predetermined item and in which a plurality of pieces of image content for the predetermined item are used;
storing, in at least one memory of the information processing apparatus, the plurality of composition styles;
acquiring, from a user apparatus through a communication interface of the information processing apparatus, an attribute of a target user;
estimating, by the information processing apparatus, a most-suitable composition style for the target user from among the plurality of composition styles based on the plurality of pieces of image content and the attribute of the target user;
generating a moving image based on the most-suitable style and the plurality of pieces of image content;
providing the moving image to the user apparatus through the communication interface;
providing, through the communication interface, each of the moving images corresponding with the respective composition styles of the plurality of composition styles to one or more user devices corresponding to one or more users selected from a plurality of users including the target user;
acquiring, from the one or more user devices, scores indicating an advertising effect from the one or more users for each of the plurality of composition styles, and to estimate the most-suitable composition style for the target user based on the scores;
acquiring, by the information processing apparatus, attributes of the plurality of users; and
deriving, by the information processing apparatus, the scores for one or more of the plurality of composition styles for which the scores have not been acquired from the target user using the scores acquired from a group of users from among the one or more users having attributes similar to the attribute of the target user.

15. A non-transitory computer readable medium storing a computer program, which when executed by at least one processor cause the at least one processor to execute a method of operating an information processing apparatus, the method comprising:
generating, by the information processing apparatus, a plurality of composition styles that each correspond to a composition of a moving image which relates to a predetermined item and in which a plurality of pieces of image content for the predetermined item are used;
storing, in at least one memory of the information processing apparatus, the plurality of composition styles;
acquiring, from a user apparatus through a communication interface of the information processing apparatus, an attribute of a target user;
estimating, by the information processing apparatus, a most-suitable composition style for the target user from among the plurality of composition styles based on the plurality of pieces of image content and the attribute of the target user;
generating a moving image based on the most-suitable style and the plurality of pieces of image content;
providing the moving image to the user apparatus through the communication interface;
providing, through the communication interface, each of the moving images corresponding with the respective composition styles of the plurality of composition styles to one or more user devices corresponding to one or more users selected from a plurality of users including the target user;
acquiring, from the one or more user devices, scores indicating an advertising effect from the one or more users for each of the plurality of composition styles, and to estimate the most-suitable composition style for the target user based on the scores;
acquiring by the information processing apparatus, attributes of the plurality of users; and
deriving, by the information processing apparatus, the scores for one or more of the plurality of composition styles for which the scores have not been acquired from the target user using the scores acquired from a group of users from among the one or more users having attributes similar to the attribute of the target user.

* * * * *